(12) United States Patent
Bissell et al.

(10) Patent No.: US 10,184,075 B2
(45) Date of Patent: Jan. 22, 2019

(54) STRONTIUM BROMIDE PHASE CHANGE MATERIAL

(71) Applicant: Sunamp Limited, East Lothian (GB)

(72) Inventors: Andrew John Bissell, East Lothian (GB); Colin Pulham, East Lothian (GB); David Oliver, East Lothian (GB)

(73) Assignee: Sunamp Limited, Edinburgh (GB)

( * ) Notice: Subject to any disclaimer, the term of this patent is extended or adjusted under 35 U.S.C. 154(b) by 201 days.

(21) Appl. No.: 14/913,398

(22) PCT Filed: Aug. 22, 2014

(86) PCT No.: PCT/GB2014/052580
§ 371 (c)(1),
(2) Date: Feb. 22, 2016

(87) PCT Pub. No.: WO2015/025175
PCT Pub. Date: Feb. 26, 2015

(65) Prior Publication Data
US 2016/0200956 A1 Jul. 14, 2016

(30) Foreign Application Priority Data

Aug. 23, 2013 (GB) .................... 1315098.2

(51) Int. Cl.
*C09K 5/00* (2006.01)
*C09K 5/06* (2006.01)

(52) U.S. Cl.
CPC .................... *C09K 5/063* (2013.01)

(58) Field of Classification Search
None
See application file for complete search history.

(56) References Cited

U.S. PATENT DOCUMENTS

| 4,003,426 A | 1/1977 | Best |
| 4,690,769 A | 9/1987 | Lane |
| 2013/0105727 A1* | 5/2013 | Rieger .................. C09K 5/063 252/75 |

FOREIGN PATENT DOCUMENTS

| CN | 101048341 A | 10/2007 |
| CN | 102827574 A | 12/2012 |
| EP | 2589638 A1 | 5/2013 |
| JP | 57180684 A | 11/1982 |

OTHER PUBLICATIONS

Examination Report for Australian Appln. No. 2014310415, dated Feb. 21, 2017.
Lane, G., et al., "Phase Change Materials for Energy Storage Nucleation to Prevent Supercooling", Solar Energy Materials and Solar Cells, Elsevier Science Publishers, Amsterdam, NL, vol. 27, No. 2 (Jul. 1992), pp. 135-160.
International Search Report for PCT/GB2014/052580, dated Nov. 14, 2014.

(Continued)

*Primary Examiner* — Necholus Ogden, Jr.
(74) *Attorney, Agent, or Firm* — Brinks Gilson & Lione

(57) ABSTRACT

There is herein described a phase change material (PCM) for use in energy storage systems. More particularly, there is described a phase change material comprising Strontium Bromide and a Metal Halide that is optimal to storing heat in about the 76° C. to 88° C. temperature range.

12 Claims, 1 Drawing Sheet

(56) References Cited

OTHER PUBLICATIONS

Examination Report for Australian Appln. No. 2014310415, dated Oct. 9, 2017.
Chinese Office Action for Appln. No. 2014800459453, dated Jun. 15, 2018.
Lane et al., "Macro-encapsulation of heat storage phase-change materials for use in residential buildings", First Quarterly Progress Report, Sep. 29-Dec. 29, 1976, The Dow Chemical Co. (Feb. 1, 1977).

* cited by examiner

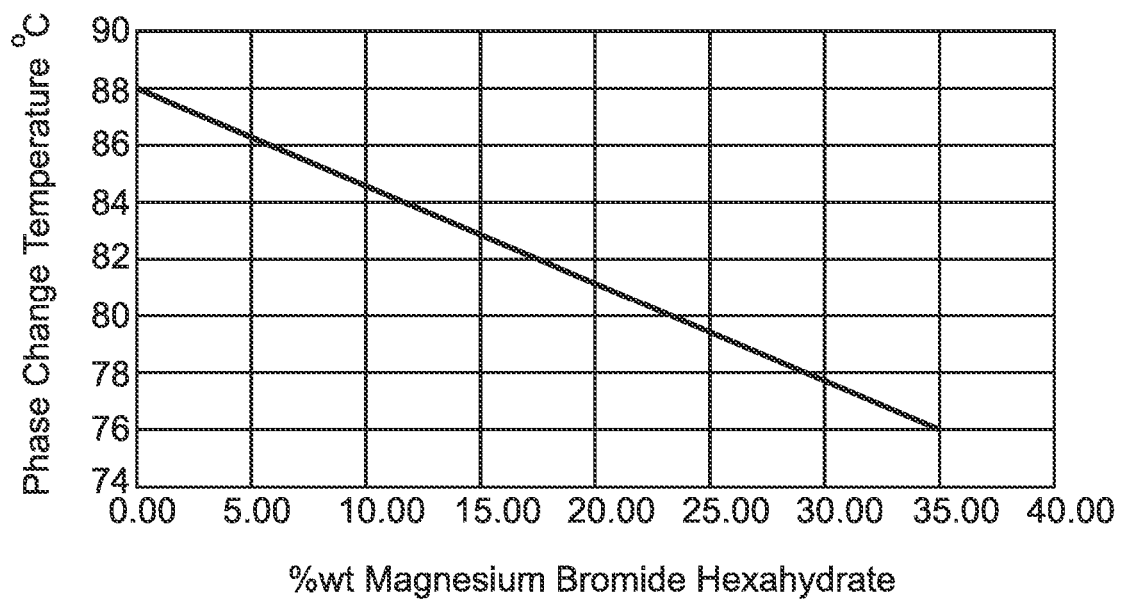

STRONTIUM BROMIDE PHASE CHANGE MATERIAL

FIELD OF THE INVENTION

The present invention relates to a phase change material (PCM) for use in energy storage systems. More particularly, the present invention relates to a phase change material comprising Strontium Bromide and a Metal Halide that is optimal to storing heat in about the 76° C. to 88° C. temperature range.

BACKGROUND OF THE INVENTION

There exists a problem in the field of phase change materials of providing a phase change material that has a phase change in about the 75° C. to 80° C. temperature range. This is because there exists at this temperature range mild incongruent melting of compositions such as magnesium bromide hexahydrate.

Strontium bromide hexahydrate has a congruent melting point of 88° C. and has rarely, if ever, been used as a PCM before. The only previous mention in the literature is having been discounted by Lane who is a leading expert in the field [Lane G. A.: Solar Heat Storage: Latent Heat Material— Volume I: Background and Scientific Principles, CRC Press, Florida (1983)] for being too expensive. There is also reference to Strontium bromide hexahydrate in U.S. Pat. No. 4,003,426 which although mentioning the strontium bromide hexahydrate as being used as a phase change material it makes no disclosure of this being used in combination with a Metal Halide.

There has therefore been much effort in the field of phase change materials to find a phase change material that has a phase change in about the 76° C. to 88° C. temperature range and is capable of operating efficiently. Such a temperature change for a phase change is extremely useful for energy storage systems capable of being used in the domestic heating market.

It is an object of at least one aspect of the present invention to obviate or mitigate at least one or more of the aforementioned problems.

It is a further object of at least one aspect of the present invention to provide a phase change material with a phase change in about the 76° C. to 88° C. temperature range.

SUMMARY OF THE INVENTION

According to a first aspect of the present invention there is provided a phase change material (PCM) comprising:
 Strontium Bromide; and
 at least one Metal Halide;
 wherein the PCM has a phase change in the region of about 76° C. to 88° C. temperature range.

Generally speaking, the present invention therefore resides in the provision of a PCM with a phase change in the region of about 76° C. to 88° C. This makes the PCM highly suitable for energy storage systems such as described in WO2009/138771 and WO2011/058383 which are incorporated herein by reference.

The PCM of the present invention is therefore based on a mixture of Strontium Bromide and a Metal Halide such as Magnesium Bromide or its hydrate. Alternatives to Magnesium Bromide may be any one of or combination of the following Bromides or their hydrates:
 Zinc Bromide;
 Cobalt Bromide;
 Lithium Bromide;
 Sodium Bromide;
 Potassium Bromide;
 Calcium Bromide;
 Iron Bromide;
 Copper Bromide; and
 Aluminium Bromide.

Alternatives to Magnesium Bromide may be any miscible organic compound.

In addition Strontium salts of Chloride may also be used.

Typically, the Strontium Bromide and the at least one Metal Halide may be in the hydrated form.

Strontium Bromide Anhydrous (CAS: 100476-81-0) and Magnesium Bromide Anhydrous (CAS: 7789-48-2) may be used instead as initial components instead of the hexahydrate forms. In this case, water must be added to reach the final PCM.

The Strontium Bromide may be present in an amount from about 20-50 wt. % and preferably about 30-35 wt. %.

The Metal Halide may be present in an amount from about 50-85 wt. % and preferably about 65-70 wt. %.

For example, a preferred embodiment may be about 25-35 wt. % or preferably 32 wt. % $MgBr_2.H_2O$; about 55-75 wt. % or preferably about 65 wt. % $SrBr_2.H_2O$; and about 1-5 wt. % or preferably about 3 wt. % water. A PCM comprising 32 wt. % $MgBr_2.H_2O$, 65 wt. % $SrBr_2.H_2O$ and 3 wt. % water was found to have a phase change of about 77° C.

At compositions of about 30-35 wt. % Magnesium Bromide Hexahydrate and about 65-70 wt. % Strontium Bromide there exists a phase change at 75° C.-80° C. This temperature is important for phase change material applications such as found in energy storage systems.

A minimum melting point at 32 wt. % $MgBr_2.H_2O$, 65 wt. % $SrBr_2.H_2O$ and 3 wt. % water was found at about 77° C.

According to a second aspect of the present invention there is provided a process for forming a PCM comprising:
 providing Strontium Bromide; and
 providing at least one Metal Halide;
 mixing said Strontium Bromide and at least one Metal Halide together;
 wherein the PCM has a phase change in the region of about 76° C. to 88° C. temperature range.

The Strontium Bromide and Metal Halide may be mixed together in a mixing vessel or heat battery enclosure if the PCM is made directly in a final heat battery.

During the mixing the temperature of the mixing vessel or heat battery enclosure may be increased to a temperature higher than the phase change temperature by about 2° C.-5° C. (e.g. 3° C.) and kept it at this temperature to melt the materials.

The resulting mixture may be stirred/mixed mixture until it is liquid and homogenous.

Alternatively, starting from the anhydrous forms the following process may be followed:
 1) Mix the correct ratio of Strontium Bromide Anhydrous and Metal Halide Anhydrous (e.g. Magnesium Bromide Anhydrous) with optionally another phase change temperature depressing substance according to the required phase change temperature.
 2) Add hot water in the correct ratio to obtain the required phase change material at a temperature above the required final phase change temperature to melt the two components. Alternatively, add water in the right ratio to obtain the required phase change material at a temperature below the required final phase change and increase the temperature of the mixing vessel or heat battery enclosure (if the PCM is made directly in the final heat battery) to a temperature higher than the phase change temperature by about 2° C.-5° C. (e.g. 3° C.) and keep it at this temperature to melt the materials.

3) Stir the mixture until it is liquid and homogenous.

The PCM may be as defined in the first aspect.

BRIEF DESCRIPTION OF THE DRAWINGS

Embodiments of the present invention will now be described, by way of example only, with reference to the accompanying drawings in which:

FIG. 1 is a representation of the relationship between the percentage of Strontium Bromide Hexahydrate against the phase change temperature.

BRIEF DESCRIPTION

Generally speaking, the present invention resides in the provision of phase change material that is optimal to storing heat in about the 76° C. to 88° C. temperature range.

The phase change material (PCM) of the present invention is based on a mixture of Strontium Bromide and a metal halide such as Magnesium Bromide. Alternatives to Magnesium Bromide may be any one of or combination of the following Bromides or their hydrates:

Zinc Bromide;
Cobalt Bromide;
Uthium Bromide;
Sodium Bromide;
Potassium Bromide;
Calcium Bromide;
Iron Bromide;
Copper Bromide; and
Aluminium Bromide.

In addition Strontium salts of Chloride may also be used.

Example 1

Below is a non-limiting example of preparing a PCM according to the present invention.

a) Starting from the Hexahydrate Forms:
1) Mix the correct ratio of the two components according to the required phase change temperature.
2) Increase the temperature of the mixing vessel or heat battery enclosure (if the PCM is made directly in the final heat battery) to a temperature higher than the phase change temperature by about 2° C.-5° C. (e.g. 3° C.) and keep it at this temperature to melt the materials.
3) Stir the mixture till it is liquid and homogenous.

b) Starting from the Anhydrous Forms:
1) Mix the correct ratio of Strontium Bromide Anhydrous and Magnesium Bromide Anhydrous (or other phase change temperature depressing substance) according to the required phase change temperature.
2) Add hot water in the correct ratio to obtain the required phase change material at a temperature above the required final phase change temperature to melt the two components. Alternatively, add water in the right ratio to obtain the required phase change material at temperature below the required final phase change and increase the temperature of the mixing vessel or heat battery enclosure (if the PCM is made directly in the final heat battery) to a temperature higher than the phase change temperature by about 2° C.-5° C. (e.g. 3° C.) and keep it at this temperature to melt the materials.
3) Stir the mixture till it is liquid and homogenous.

At compositions of about 30-35 wt. % Magnesium Bromide Hexahydrate and about 65-70 wt. % Strontium Bromide there exists a phase change at 75° C.-80° C. This temperature is important for phase change material applications.

A minimum melting point at 32 wt. % $MgBr_2.H_2O$, 65 wt. % $SrBr_2.H_2O$ and 3 wt. % water was found at about 77° C.

Further Examples

The following non-limiting examples provided in the Experimental results are representative of the PCM composition $MX.nH_2O$ with varying amounts of miscible organic compound, as are the processes for their preparation.

$SrBr2.6H2O$:

Example 2: Addition of Glycerol to Strontium Bromide Hexahydrate to Depress Melting Point Test samples of strontium bromide hexahydrate (Sunamp supplied) and glycerol (available from VWR CAS 56-81-5) were prepared, from 100% strontium bromide hexahydrate composition to 1:1 molar ratio using the masses listed below. The samples were then heated to 95° C. whilst stirring, to ensure a homogenous mixture. Upon cooling and solidifying, the samples remained as a single phase.

| Molar Ratio | Mass (g) | |
|---|---|---|
| | strontium bromide hexahydrate | Glycerol |
| 9:1 | 19.4405 | 0.5595 |
| 8:2 | 18.7837 | 1.2163 |
| 7:3 | 18.0018 | 1.9982 |
| 6:4 | 17.0551 | 2.9449 |
| 5:5 | 15.8855 | 4.1145 |

Upon observing the melting and freezing of the materials (heating to 95° C. in a water bath, allowing the materials to fully melt, and then cooling to room temperature in air, recording temperature of material using thermocouple) it was seen that the melting point was progressively depressed, with increasing amounts of glycerol. Repeated cycling confirmed that the melting and freezing point of strontium bromide was decreased with the addition of glycerol. The extent of depression, with the corresponding molar and weight % of glycerol, is listed below.

| The effect of increasing the amount of glycerol on the freezing temperature of the samples | | |
|---|---|---|
| Molar | Temp/° C. | Mass |
| 0% | 88 | 0% |
| 10% | 84 | 2.8% |
| 20% | 78 | 6.1% |
| 30% | 71 | 10% |
| 40% | 66 | 14.7% |
| 50% | 55 | 20.6% |

Example 3: Addition of Trimethylolethane (TME) to Strontium Bromide Hexahydrate to Depress Melting Point Test samples of strontium bromide hexahydrate and TME (available from Fischer Scientific Ltd. CAS 77-85-0) were prepared using the ratios listed below and using the same method as in Example 1.

|  | Mass (g) | |
| --- | --- | --- |
| Molar Ratio | strontium bromide hexahydrate | TME |
| 9:1 | 19.2762 | 0.7238 |
| 8:2 | 18.4420 | 1.5580 |
| 7:3 | 17.4699 | 2.5301 |
| 6:4 | 16.3227 | 3.6773 |
| 5:5 | 14.9485 | 5.0515 |

Temperatures during the melting and freezing of the materials were recorded using the same method as listed in Example 2. As seen in Example 2, increased melting and freezing point depression was observed with increasing amounts of TME.

The effect of increasing the amount of TME on the freezing temperature of the samples

| Molar | Temp/° C. | Mass |
| --- | --- | --- |
| 0% | 88 | 0% |
| 10% | 84 | 3.6% |
| 20% | 79 | 7.8% |
| 30% | 76 | 12.7% |
| 40% | 75 | 18.4% |
| 50% | 68 | 25.3% |

Example 4: Addition of Acetamide to Strontium Bromide Hexahydrate to Depress Melting Point Test samples of strontium bromide and acetamide (available from Alfa Aesar CAS 77-85-0) were prepared using the ratios listed below and using the same method as in Example 2.

|  | Mass (g) | |
| --- | --- | --- |
| Molar Ratio | strontium bromide hexahydrate | acetamide |
| 9:1 | 19.6375 | 0.3625 |
| 8:2 | 19.2024 | 0.7976 |
| 7:3 | 18.6706 | 1.3294 |
| 6:4 | 18.0057 | 1.9943 |
| 5:5 | 17.1506 | 2.8494 |

The effect of increasing the amount of acetamide on the freezing temperature of the samples

| Molar | Temp/° C. | Mass |
| --- | --- | --- |
| 0% | 88 | 0% |
| 10% | 86 | 1.8% |
| 20% | 84 | 4.0% |
| 30% | 73 | 6.6% |
| 40% | 68 | 10.0% |
| 50% | 64 | 14.2% |

Whilst specific embodiments of the present invention have been described above, it will be appreciated that departures from the described embodiments may still fall within the scope of the present invention. For example, any suitable type of mixture of Strontium Bromide and metal halide may be used along with additional components where necessary. The amount of each component may be varied to adjust for the required phase change temperature.

The invention claimed is:

1. A phase change material (PCM) comprising:
    about 65 wt. % to about 95 wt. % Strontium Bromide Hexahydrate; and
    at least one Metal Halide selected from the group consisting of Magnesium Bromide; Zinc Bromide; Cobalt Bromide; Lithium Bromide; Sodium Bromide; Potassium Bromide; Calcium Bromide; Iron Bromide; Copper Bromide; Aluminium Bromide; and any hydrate or combination thereof;
    wherein the PCM exhibits a phase change at a temperature range of about 76° C. to about 88° C.

2. A phase change material (PCM) according to claim 1, wherein the PCM is used in an energy storage system.

3. A phase change material (PCM) according to claim 1, wherein the Metal Halide is Magnesium Bromide or a hydrate thereof.

4. A phase change material (PCM) according to claim 1, wherein the PCM further comprises Strontium salts of Chloride.

5. A phase change material (PCM) according to claim 1, wherein the Strontium Bromide Hexahydrate is present in an amount of about 65 wt. %.

6. A phase change material (PCM) according to claim 1, wherein the Metal Halide is present in an amount from about 25 wt. % to about 35 wt. %.

7. A phase change material (PCM) according to claim 1, wherein the PCM is about 25 wt. % to about 35 wt. % $MgBr_2.6H_2O$, about 55 wt. % to about 75 wt. % $SrBr_2.6H_2O$ and about 1 wt. % to about 5 wt. % water.

8. A phase change material (PCM) according to claim 1, wherein the PCM comprises 32 wt. % $MgBr_2.6H_2O$, 65 wt. % $SrBr_2.6H_2O$ and 3 wt. % water and exhibits a phase change at a temperature of about 77° C.

9. A method for forming the phase change material (PCM) of claim 1 comprising:
    providing Strontium Bromide Hexahydrate;
    providing at least one Metal Halide; and
    mixing said Strontium Bromide Hexahydrate and at least one Metal Halide together;
    wherein the PCM exhibits a phase change at a temperature range of about 76° C. to about 88° C.

10. A method for forming a phase change material PCM according to claim 9, wherein when the PCM is formed directly in a final heat battery, the Strontium Bromide Hexahydrate and Metal Halide are mixed together to form a mixture in a mixing vessel or heat battery enclosure.

11. A method for forming a phase change material PCM according to claim 10, wherein during the mixing, the temperature of the mixing vessel or heat battery enclosure is increased and maintained at a temperature higher than the phase change temperature by about 2° C. to about 5° C.

12. A method for forming a phase change material PCM according to claim 11, wherein the resulting mixture is stirred or mixed until the mixture is liquid and homogenous.

* * * * *